Oct. 11, 1949.  L. W. TAYLOR  2,484,129
GEAR PULLER
Filed Nov. 26, 1946

INVENTOR
Louis W. Taylor
BY
Philip A. Fridell
ATTORNEY

Patented Oct. 11, 1949

2,484,129

UNITED STATES PATENT OFFICE 2,484,129

GEAR PULLER

Louis W. Taylor, Oakland, Calif.

Application November 26, 1946, Serial No. 712,270

1 Claim. (Cl. 29—261)

This invention relates to manually operable means for removing gears from the terminal ends of shafts and particularly to means for the removal of drive pinions from drive shafts of automotive vehicles.

Conventional methods of removing these drive pinions include: driving the shaft out of the pinion; the use of a forcing press with which the majority of automotive repair shops are not equipped; and the use of conventional gear pullers which often damage the gear or the shaft, or slip off the gear or pinion during the pulling operation, or do not have the necessary power ratio or strength to remove a tightly stuck gear. When one of these pullers slips off the gear it invariably destroys the usefulness of the gear, sometimes even breaking the teeth.

My invention overcomes all of the disadvantages of conventional gear pullers and provides a manually operable mechanism which does not grip the gear tight enough to cause any damage but which cannot under any conditions slip off the gear. It has sufficient power ration to pull the tightest drive pinion off its drive shaft, and will pull these pinions or gears off either solid or tubular shafts. It is self-adjusting after once being applied to the gear. Operation of the forcing apparatus first causes the tool to grip the gear and then forces the shaft out of the gear. No collar, die or other mechanism is required, the tool being self-contained and complete.

This gear puller is not limited to the removal of gears and pinions from drive shafts but can be used for removing bearings and flanges and other parts where the element to be removed can be gripped externally, and is self-adjusting through a diameter range of about six. The specific link connection of the jaws always draws the jaws inward under force but limits the inward pull to that necessary to assure a good grip without damaging the teeth or periphery of the element being removed and yet being outwardly immovable in its gripping position so that the jaws cannot slip off the element and thus cause damage to either the element or the jaw points.

The puller though regularly equipped with three jaws for three-point gripping, is arranged so that one of the jaws can be removed and another placed in a position diametrically opposite to the third to make a two-point puller for cases where an element is accessible only at two diametrically opposite points. No other puller is capable of being adapted to either two- or three-point pull.

A receding center assures proper alignment of the tool and compensates for variations in the relative planes of the backs of gears and ends of shafts, and this center also serves as a centering device and retainer for shoulder collars for use in connection with tubular shafts.

The objects and advantages of the invention are as follows:

First, to provide a manually operable tool for removing gears and pinions from the ends of shafts.

Second, to provide a tool as outlined which is interchangeable for two- or three-point gripping and pulling, at will.

Third, to provide a tool as outlined which provides a positive but controlled grip on the element to be removed.

Fourth, to provide a tool as outlined with a receding center which functions as an axial aligner for the tool, and when required, a centering device and retainer for a shouldered washer for operation on tubular shafts.

Fifth, to provide a tool as outlined which is automatically adjustable for pulling elements within a diametric ratio of about six.

In describing the invention reference will be made to the accompanying drawings, in which.

Figure 1:
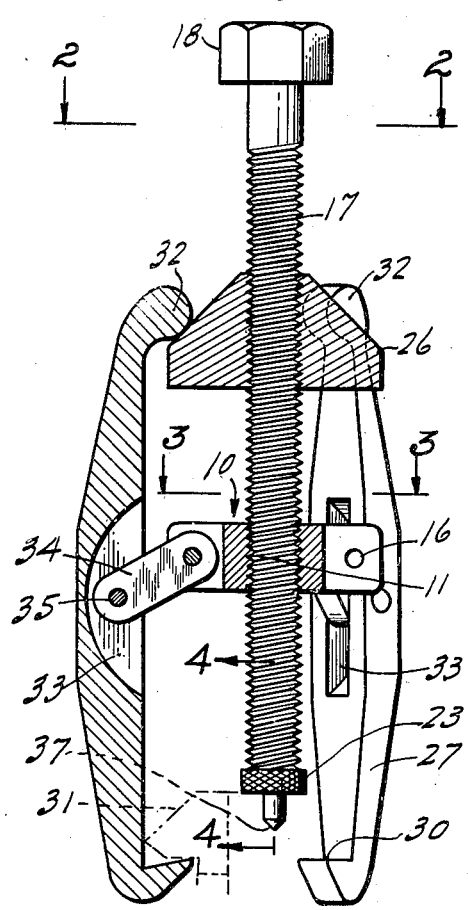
Fig. 1 is a side sectional elevation through the invention.
Figure 3:
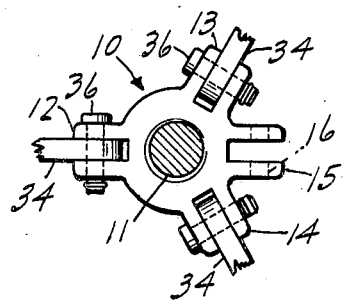
Fig. 3 is a section taken on line 3—3 of Fig. 1.
Figure 4:
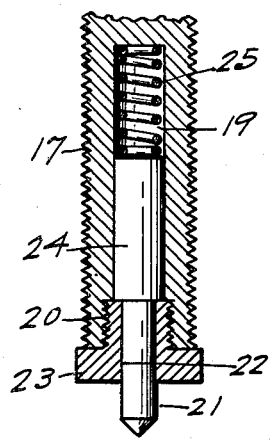
Fig. 4 is an enlarged section through the terminal portion of the power screw showing the receding center.
Figure 2:
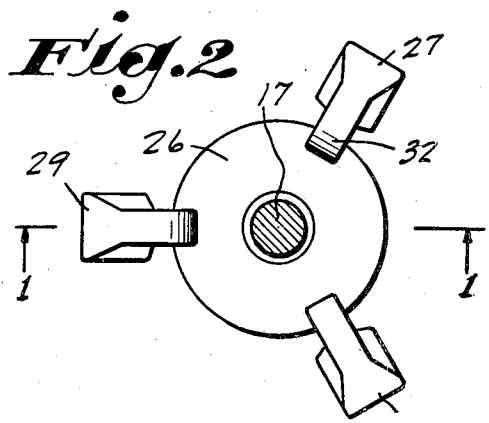
Fig. 2 is a section taken on line 2—2 of Fig. 1.
Figure 5:
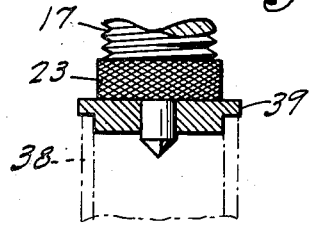
Fig. 5 is an enlarged fragmentary view of the end of the screw and with a shouldered washer shown in section and centering a tubular shaft.

The invention includes a spider 10 which is internally threaded as indicated at 11 and has four pairs 12, 13, 14 and 15 of ears, the ears 12, 13 and 14 being equi-angularly spaced, and the ears 15 being diametrically opposite to one of the other pairs, and each pair of ears has a transverse pin passage 16.

The power screw 17 threadedly operates through the threaded bore 11 and has suitable means for manually applying power such as the hex head 18 for operation by means of a wrench, and the lower end of the screw is internally bored as indicated at 19 and counterbored and threaded as indicated at 20.

The receding center 21 slidably operates through a bore 22 which is smaller in diameter than the bore 19 and axially formed through the knurled bushing 23, and the receding center is enlarged as indicated at 24 to slidably operate in the bore 19 and is limited as to outward movement by the bushing and urged outward by the compression spring 25.

A spreader cone 26 is threadedly operable on the power screw and can be adjusted manually for initial gripping of the jaws and is self-adjusting thereafter.

Three jaws 27, 28 and 29 are supplied with the tool and are formed with hooked ends as indicated at 30 to engage the underside of a pinion 31 or other element to be removed, and each has a finger element 32 formed at the other end to cooperate with the conical surface of the adjusting cone 26, and a slot 33 is formed in the inner side, and links 34 are pinned in the respective recesses as indicated at 35, the other ends of the links being pivotally connected between the ears 12, 13 and 14 of the spider. The pins 36 are removable at will to permit changing the tool to the two-jaw type, two jaws being removed and one of these being mounted with its link between the ears 15, with the two jaws diametrically related.

The cone 26 is adjusted down sufficiently to allow the jaws to pass over the periphery of the gear and is then adjusted up to where the cone suitably separates the upper ends or fingers of the jaws, the center 21 is located in the center on the shaft as indicated at 37 after which the screw 17 is turned down which draws the spider up actually suspending the jaws by the links, the inward pull on the jaws decreasing relatively as the links assume positions more nearly parallel to the screw, thus minimizing the pressure on the periphery of the pinion, and as soon as the fingers come in contact with the cone, the cone is frictionally restrained allowing only such movement of the cone as is necessary to maintain the positive grip of the jaws. During the pull, the bottom of the knurled screw 23 presses directly against the end of a solid shaft. If the shaft is tubular as indicated at 38, a shouldered washer 39 is placed on the end of the screw and centered by the receding center, and the outside diameter is made slightly less than the bore of the pinion so that the washer will pass through the pinion along with the shaft.

I claim:

A gear puller including a jack screw, a spider threaded on said jack screw, a plurality of elongated gripping fingers, a link for each finger, means pivoting one end of each link to its finger at a point centrally of the length of its finger, means pivoting the other end of each link to the spider, a gripping finger spreader threaded on said screw above said spider for manual adjustment on said screw and having its top surface conically formed; each of said gripping fingers having an inwardly projecting rounded portion to cooperate with said conical surface; said spreader initially functioning as spreading means to cause the other ends of the gripping fingers to grip an object, and finally as anchoring means for the upper ends of the fingers when the object is gripped, and a head formed on said jack screw for operation by a wrench or the like.

LOUIS W. TAYLOR.

REFERENCES CITED

The following references are of record in the file of this patent:

UNITED STATES PATENTS

| Number | Name | Date |
| --- | --- | --- |
| 1,259,036 | Mitchell | Mar. 12, 1918 |
| 1,313,511 | Beach | Aug. 19, 1919 |
| 1,580,982 | Woolridge | Apr. 13, 1926 |
| 1,709,913 | Kaplan | Apr. 23, 1929 |
| 1,827,475 | Keefer | Oct. 13, 1931 |
| 2,385,000 | Hoke | Sept. 18, 1945 |